United States Patent [19]

Lavallee et al.

[11] 4,288,821

[45] Sep. 8, 1981

[54] MULTI-RESOLUTION IMAGE SIGNAL PROCESSING APPARATUS AND METHOD

[75] Inventors: Pierre A. Lavallee, Penfield; James C. Stoffel, Rochester, both of N.Y.

[73] Assignee: Xerox Corporation, Stamford, Conn.

[21] Appl. No.: 155,269

[22] Filed: Jun. 2, 1980

[51] Int. Cl.³ .............................................. H04N 1/40
[52] U.S. Cl. .................................... 358/293; 358/280; 358/294
[58] Field of Search ................ 358/280, 293, 294, 256

[56] References Cited

U.S. PATENT DOCUMENTS

| | | | |
|---|---|---|---|
| 3,781,558 | 12/1973 | Anderson | 250/332 |
| 3,887,939 | 6/1975 | Hunt | 358/75 |
| 4,004,079 | 1/1977 | Boston | 358/256 |
| 4,122,352 | 10/1978 | Crean | 358/293 |
| 4,149,090 | 4/1979 | Agulnek | 358/293 |
| 4,149,091 | 4/1979 | Crean | 358/293 |
| 4,192,015 | 3/1980 | Thompsett | 365/114 |
| 4,193,087 | 3/1980 | Altman | 358/93 |
| 4,193,092 | 3/1980 | Stoffel | 358/280 |
| 4,194,221 | 3/1980 | Stoffel | 358/280 |

Primary Examiner—Howard Britton

[57] ABSTRACT

An image signal processing architecture for image filtering using high and low image resolution scanning arrays to scan a document original. The image pixels produced by the high resolution scanning array are analyzed to determine the presence of high frequency halftone image pixels. Where high frequency halftone image pixels are not found, the image pixels are filtered to enhance the signal content and thereafter thresholded adaptively. Where high frequency halftone image pixels are determined to be present, the pixels produced by the low resolution array are descreened and thereafter rescreened at different screen frequency. A control switch permits the user to process continuous tone images directly. In the principal embodiment, both high and low resolution scanning arrays are disposed on a common substrate to form a unitary structure. In a second embodiment, separate scanning arrays are spaced at preset distances from the object plane to provide the requisite high and low image reading resolutions. To correlate image resolutions between the scanning arrays interpolation means are provided to interpolate additional image pixels in the output of the low resolution array.

30 Claims, 14 Drawing Figures

MULTI-RESOLUTION IMAGE SIGNAL PROCESSING APPARATUS AND METHOD

This invention relates to signal processing architecture for image filtering, and more particularly, to an improved signal processing architecture for image filtering employing multiple scanning arrays of differing resolution.

Architectures for processing image signals of mixed halftone, text, and continuous tone are normally quite complicated. One cause is traceable to the limited resolution capabilities of the reproduction apparatus employed; another, to the need to process the differing types of image signals in the particular and often divergent ways required to provide an enhanced output. One arrangement capable of accommodating both the limited resolution capabilities of the reproduction apparatus and the differing processing needs is disclosed in U.S. Pat. No. 4,194,221 issued on Mar. 18, 1980 to James C. Stoffel. In that system, a scrolling buffer is employed as a temporary store for the several lines of image signals required. It would, however, be advantageous, particularly in the light of the relatively high cost of buffers, if the scrolling buffer used in that system could be reduced in size or eliminated entirely.

This invention relates to an improved signal processing architecture for image filtering requiring only minimal signal storage buffer capacity, comprising in combination, a first relatively high resolution image scanning array; threshold means for thresholding the image signals produced by the first array; a second relatively low resolution image scanning array; means for descreening and rescreening the image signals produced by the second array; and selector means for selecting the image signal output of the threshold means when the original is composed primarily of text or low frequency halftones, or of the descreening/rescreening means when the original is composed primarily of high frequency halftone images.

This invention also relates to an improved image scanning apparatus having reduced image signal buffer requirements comprising first and second linear scanning arrays, the image resolution of the first scanning array being greater than the image resolution of the second scanning array to provide image signals of different image content with resort to buffer storage.

Other objects and advantages of the present invention will be apparent from the ensuing description and drawings in which.

Figure 1:
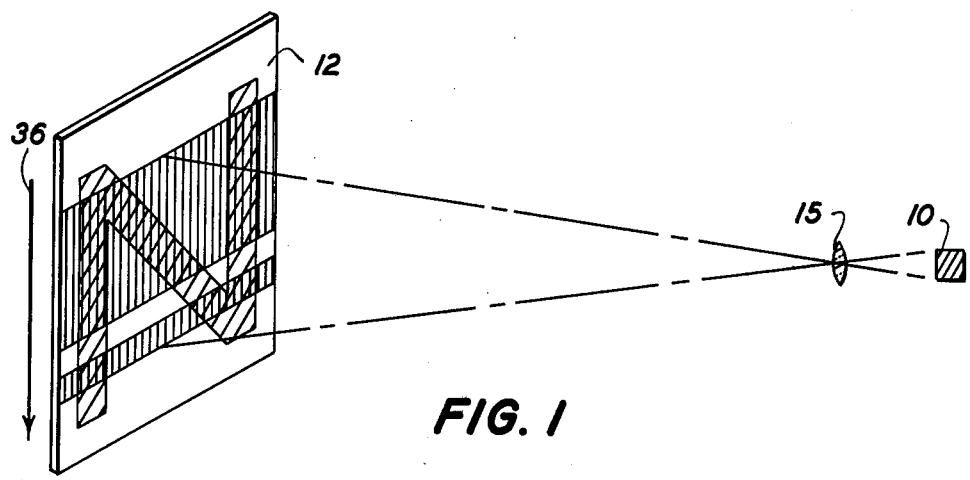
FIG. 1 is a schematic view showing the image signal processing architecture of the present invention with multi-resolution scanning array.
Figure 2:
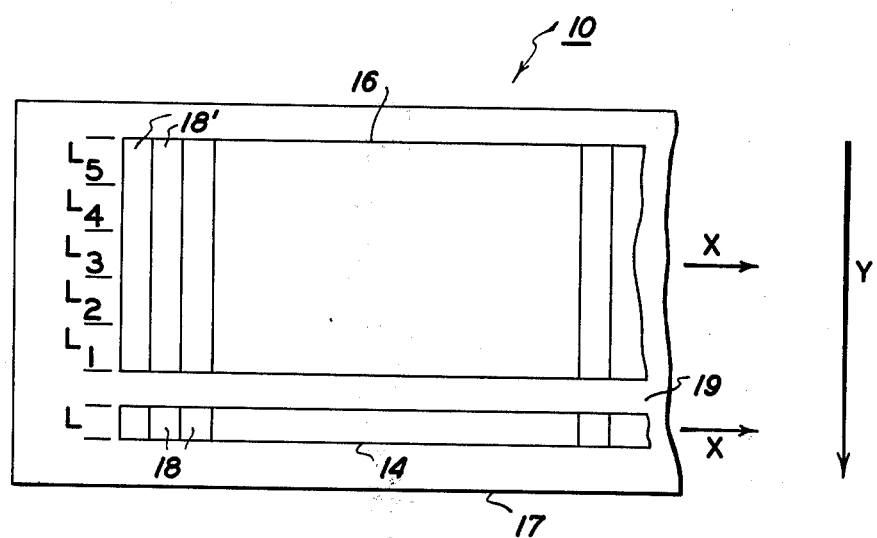
FIG. 2 is an enlarged view showing details of the multi-resolution scanning array shown in FIG. 1.

Referring particularly to FIGS. 1 and 2 of the drawings, the signal processing architecture of the present invention includes a monolithic scanning array or chip 10 having high and low resolution array pair 14, 16 thereon for simultaneously scanning an original 12 to produce image signals or pixels representative of original 12 in registered context. In content, the original 12 may be composed entirely of lines, (i.e. text), or low frequency halftone images, or high frequency halftone images, or continuous tone images, or combinations thereof. Where the original 12 consists of lines, as for example a typed page, the image signals obtained are normally at one of two voltage levels, one representing non-image or background areas and the other image areas.

A continuous tone image comprises an unscreened image, typically a photograph. When scanned, the voltage values of the image signals produced are representative of the gray levels making up the picture.

A halftone image, typically a picture or scene, is one which has been reproduced through a screening process. One example is a newspaper picture. The screen used may be either a high frequency or low frequency screen. A high frequency screen is arbitrarily defined herein as one having a frequency of 100 cells per inch or more while a low frequency screen is defined as one having a frequency less than 100 cells per inch. Halftone images therefore, comprise a pattern of discrete dots, the dot size and frequency of which depends upon the screening frequency used. When viewed by the human eye, the dot pattern conveys a likeness of the original picture or scene. The quality of the reproduction depends upon the screening frequency used, with higher screen frequencies normally providing higher quality reproductions.

High and low resolution arrays 14, 16, which are disposed in closely adjoining parallel relation on a suitable substrate material 17, each include a plurality of image viewing elements or cells 18, 18' for sensing the intensity of the image portion or area viewed by the cell. Following viewing, which takes place over an integration interval, the array cells 18, 18' are sampled successively to produce a stream of analog image signals or pixels representative of the image scanned. Preferably, the space 19 between arrays 14, 16 substantially equals the width of the scan line scanned by high resolution array 14.

Arrays 14, 16 scan or view the document original at different resolutions, high resolution array 14 scanning the image at a relatively high vertical resolution while low resolution array 16 scans the image at a relatively low vertical resolution. For this purpose, the physical size or dimension of cells 18' of array 16 are larger than the cells 18 of array 14 in a vertical scan direction (i.e.

along the Y axis). The resolution, however, of both arrays 14, 16 along the sagittal or horizontal direction (along the X axis) is the same. A suitable lens 15 is provided to focus arrays 14, 16 on original 12.

As will be understood, suitable lamp means (not shown) are provided to illuminate the original 12, during scanning. And, as will be understood, drive means (not shown) are provided to establish relative scanning movement between the scanning array 10 and the original 12 during scanning. One suitable apparatus of this nature is disclosed in U.S. Pat. No. 4,122,352 issued Oct. 24, 1978 to Peter A. Crean et al.

Figure 3:
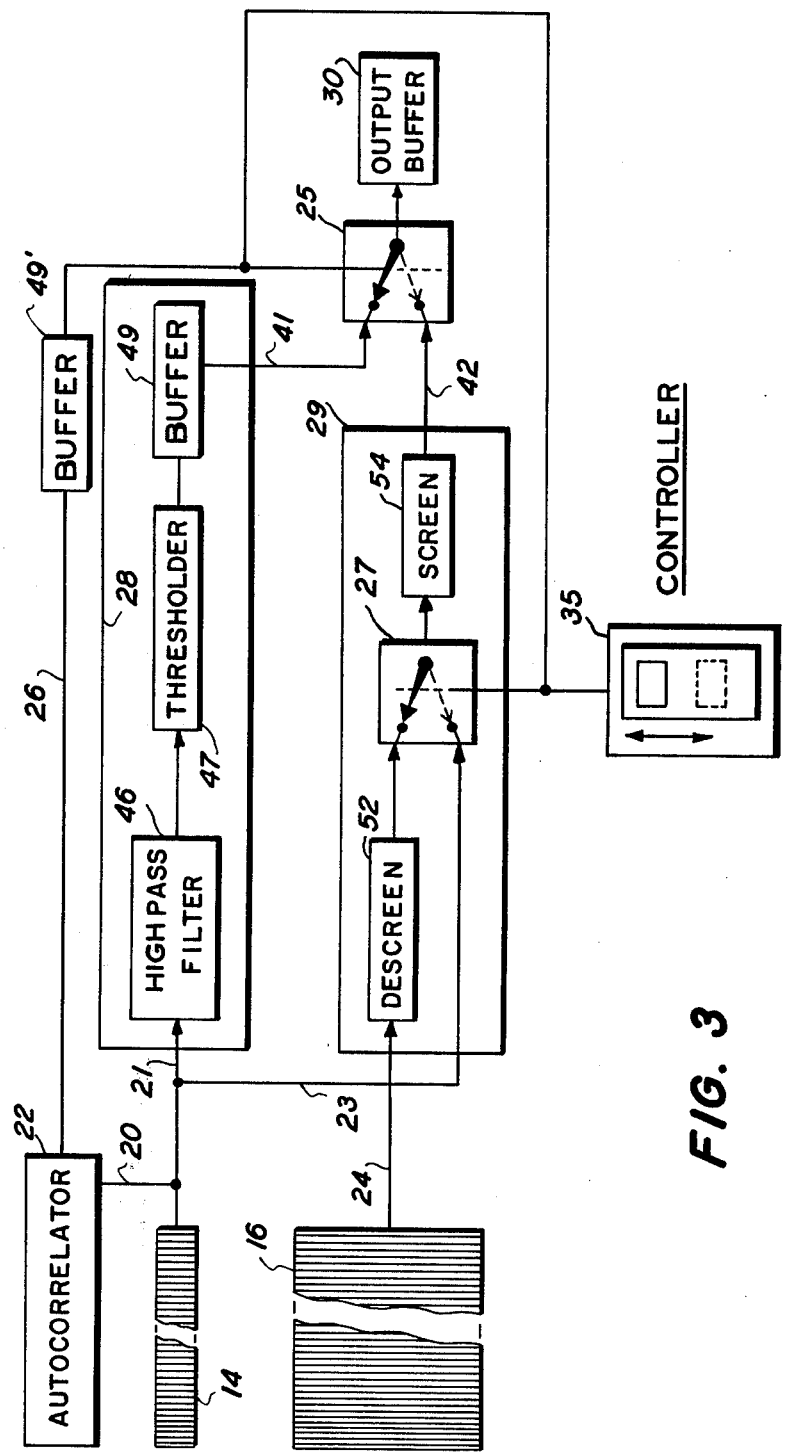
FIG. 3 is a schematic diagram of the image signal processing architecture of the present invention.

Referring particularly to FIG. 3, analog image pixels produced by high resolution array 14 are input via lead 20 to autocorrelator 22 which serves to detect the presence of high frequency halftone data in the pixel stream, as will appear. The signal output of autocorrelator 22 controls selector 25 to output processed image pixels from either low frequency halftone and line processing section 28 or high frequency halftone and continuous tone processing section 29 to output 30.

Image pixels from high resolution array 14 are additionally input through line 21 to low frequency halftone and line processing section 28 and through line 23 to selector 27 of high frequency halftone and continuous tone processing section 29.

Image pixels from low resolution array 16 are input through line 24 to descreening filter 52 of high frequency halftone and continuous tone processing section 29.

Low frequency halftone and line processing section 28 includes a high bandpass filter 46 for filtering image pixels input to section 28. Filtered signals from filter 46 are output to thresholder 47 where the pixels are thresholded. Signals processed by thresholder 47 are input to binary line storage and delay buffer 49 where the pixels are held pending scanning of the same image area by low resolution array 16, as will appear more fully herein. From buffer 49, the pixels are output to selector 25.

High frequency halftone and continuous tone processing section 29 includes a one dimensional descreening filter 52 which serves to descreen the high frequency image pixel output of low resolution array 16. Descreened pixels are passed via selector 27 to screen 54 where the signals are rescreened. Continuous tone image pixels from high resolution array 14 are input directly to screening circuit 54 via lead 23 and selector 27.

Referring particularly to FIGS. 3-9, to detect the presence of high frequency halftone image data, autocorrelator 22 autocorrelates each pixel block in accordance with a predetermined algorithm to determine if the image data is high frequency halftone or not. In order to enhance that decision, additional pixels on both sides of the pixel being investigated are used. In the exemplary arrangement shown, image data is processed on a pixel by pixel basis with pixel $P_4$ being the particular pixel in process at the instant shown in FIGS. 4 and 5.

Autocorrelation is carried out in accordance with the following function:

$$A(n) = \sum_{t=0}^{t=\text{last}} p(t) \times p(t+n)$$

where n = the bit or pixel number;
p = the pixel voltage value; and
t = the pixel position in the data stream.

The size of the image blocks examined may comprise one or more pixels, with a total block size including the block of image pixels being examined preferably being of from 16 to 64 pixels in length. In the exemplary arrangement shown, image pixels are examined in blocks of one pixel each over a total pixel length of 16 pixels. In this example, the 7 pixels ($P_3$, $P_2$, $P_1$, $P_0$, $P_0$, $P_0$, $P_0$) preceding the pixel in question (pixel $P_4$) and the 8 succeeding pixels ($P_5$, $P_6$, $P_7$, $P_8$, $P_9$, $P_{10}$, $P_{11}$, $P_{12}$) are used in the autocorrelation process. Where the block of pixels being examined includes margin or areas outside the document edges, represented by pixel $P_0$, a pixel value of "0" is arbitrarily used to represent the image value thereof.

The resulting data is scanned for positive peaks by a peak detector. Peaks above a certain threshold level are detected and where the distance (i.e. PERIOD) between the voltage peaks in the signal is less than a preset number, a decision is made to treat the pixel block being examined as high frequency halftone image data. In that circumference, a preset control signal, i.e. a binary "1" is output to selector 25 via line 26. Where the PERIOD is greater than the preset number, a decision is made to treat the pixel block as low frequency halftone or line and a second preset signal, i.e. a binary "0" is output to selector 25. In the case of continuous tone, selection is made by the user or operator via selector 27, as will appear.

Selector 25 selects from the outputs of low frequency halftone and line copy processing section 28, and high frequency halftone and continuous tone processing section 29 in response to the control signals inputted thereto.

Figure 5:
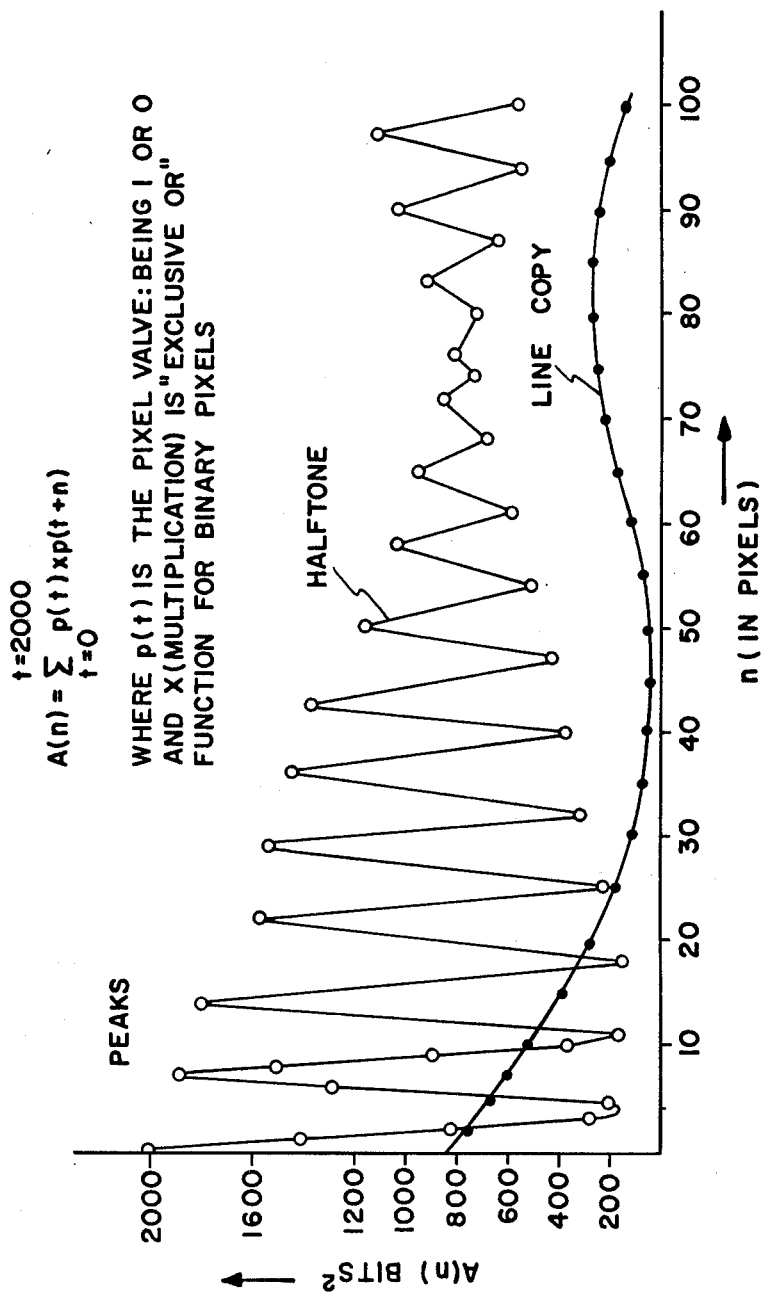
FIG. 5 is a plot of an exemplary half-tone/line autocorrelation.
Figure 6:
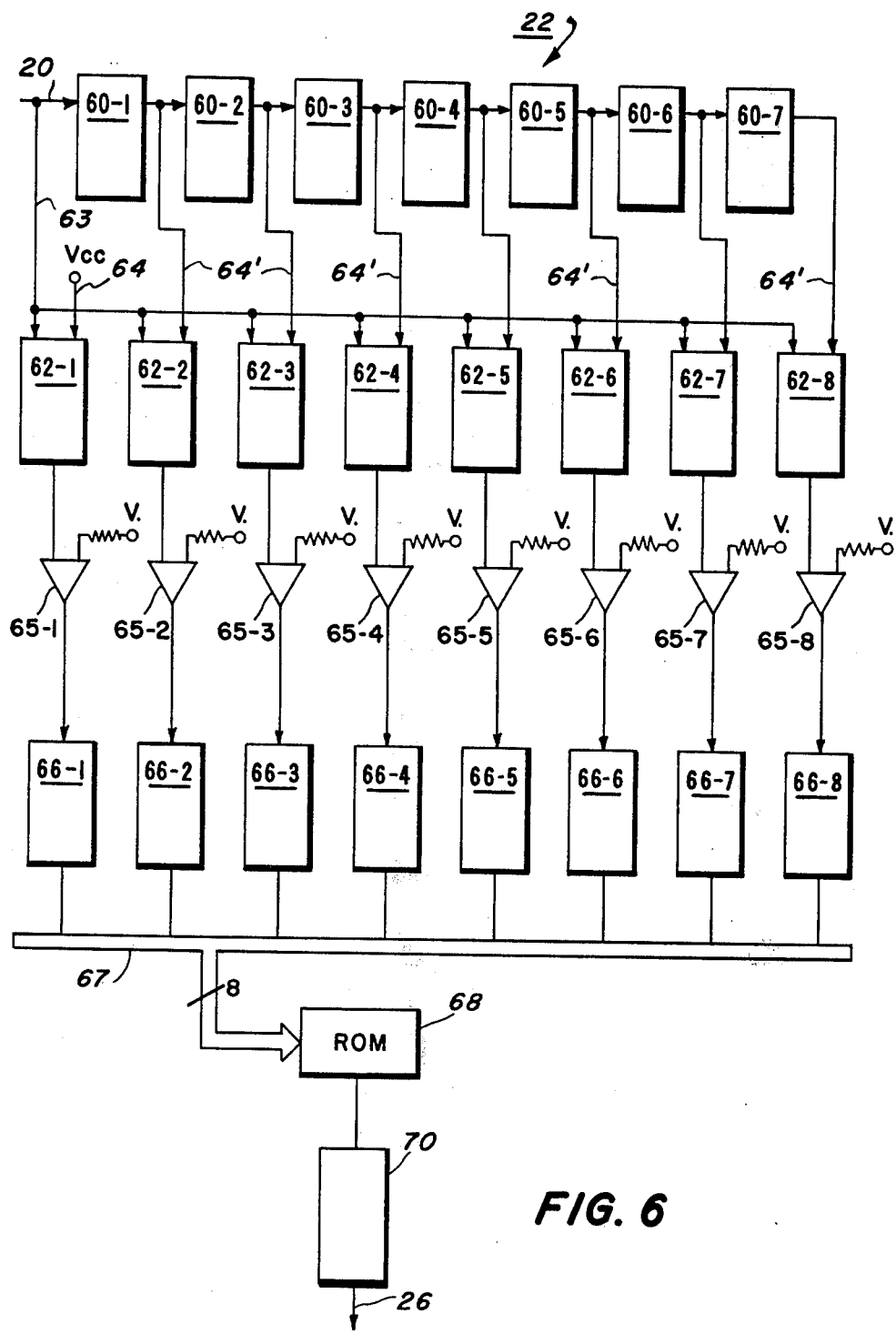
FIG. 6 is a schematic view showing details of the pixel image data auto correlator.

Referring to FIG. 6, autocorrelator 22 includes a succession of flip flops 60-1 through 60-7 through which the input pixel stream input through line 20 are shifted, one pixel at a time. Correlators 62-1 through 62-8, which may comprise TRW 64 bit digital correlators (Model TDC 1004J), have one input coupled to pixel input line 20 through distributor lead 63. Line 64 couples a second input of correlator 62-1 to a suitable voltage source Vcc while lines 64' couple a second input of the remaining correlators 62-2 through 62-8 to the outputs of flip flops 60-1 through 60-7 respectively. A typical output of correlators 62-1 through 62-8 for both line and halftone image examples, is shown in FIG. 5.

The signal output of correlators 62-1 through 62-8 is fed to one input of comparators 65-1 through 65-8 respectively. Comparators 65-1 through 65-8 may for example, comprise Signetics Model 521 comparators. A threshold voltage V, derived from a suitable voltage source (not shown), is placed on the other input of comparators 65-1 through 65-8. The outputs of comparators 65-1 through 65-8 are coupled to flip flops 66-1 through 66-8 respectively. The outputs of flip flops 66-1 through 66-8, which together combine to provide an address signal to Read Only Memory (ROM) 68, are coupled to address bus 67.

ROM 68 provides a predetermined control signal output in response to each address provided by flip flops 66-1 through 66-8. The output of ROM 68 is coupled to control flip flop 70 which provides the control signal input to line 26 controlling selector 25.

Figure 7:
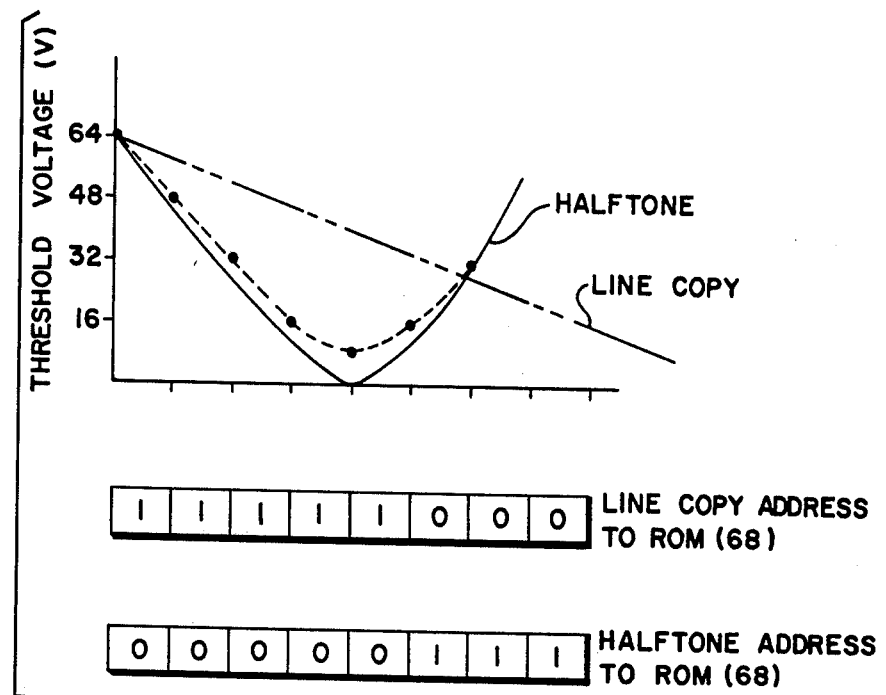
FIG. 7 is a graphical representation of typical halftone and line image waveform generated by the auto correlator of FIG. 6.

An example of the function and operation of comparators 65-1 through 65-8, together with flip flops 66-1 through 66-8 in forming an address to ROM 68 in bus 67 is shown in FIG. 7.

Flip flops 60-1 through 60-7, 66-1 through 66-8, and 70 may comprise Texas Instruments Model SN 74174 chips.

In operation, input pixels are progressively shifted through input flip flops 60-1 through 60-7 of autocorrelator 22. As the pixels shift through flip flops 60-1 through 60-7, autocorrelation of the pixel in line 20 with reference voltage Vcc and with preceding pixels is carried out by correlators 62-1 through 62-8. The output of each correlator is compared to a threshold voltage V by comparators 65-1 through 65-8. The resulting combined signal output of comparators 65-1 through 65-8 to output flip flops 66-1 through 66-8 provides an address for ROM 68. The addressed signal output of ROM 68 sets flip flop 70, providing a control signal in line 26 to selector 25.

It will be understood that different threshold voltages V may be applied to each correlator 65-1 through 65-8. Further, that number of pixels autocorrelated at one time may be enlarged or decreased by adding to or subtracting from the component parts of autocorrelator 22.

Figure 8:
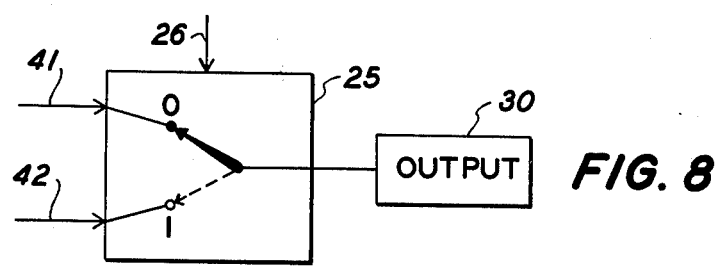
FIG. 8 is a schematic view of the pixel output selector.

Referring particularly to FIG. 8, selector 25 comprises any suitable electronic switch operable in response to a control signal input to couple one of the output lines 41, 42 from low frequency halftone and line processing section 28, or high frequency halftone and continuous tone processing section 29 respectively to output 30. For descriptive purposes, selector 25 is illustrated simply as a two position rotary switch effective on a binary "0" control signal from autocorrelator 22 to couple the output of low frequency halftone and line processing section 28 to output 30, and on the binary "1" control signal from autocorrelator 22, to couple the output of high frequency halftone and continuous tone processing section 29 to output 30. Buffer 49' in line 26 serves to delay the control signal output for synchronization purposes, as will appear.

Figure 4:
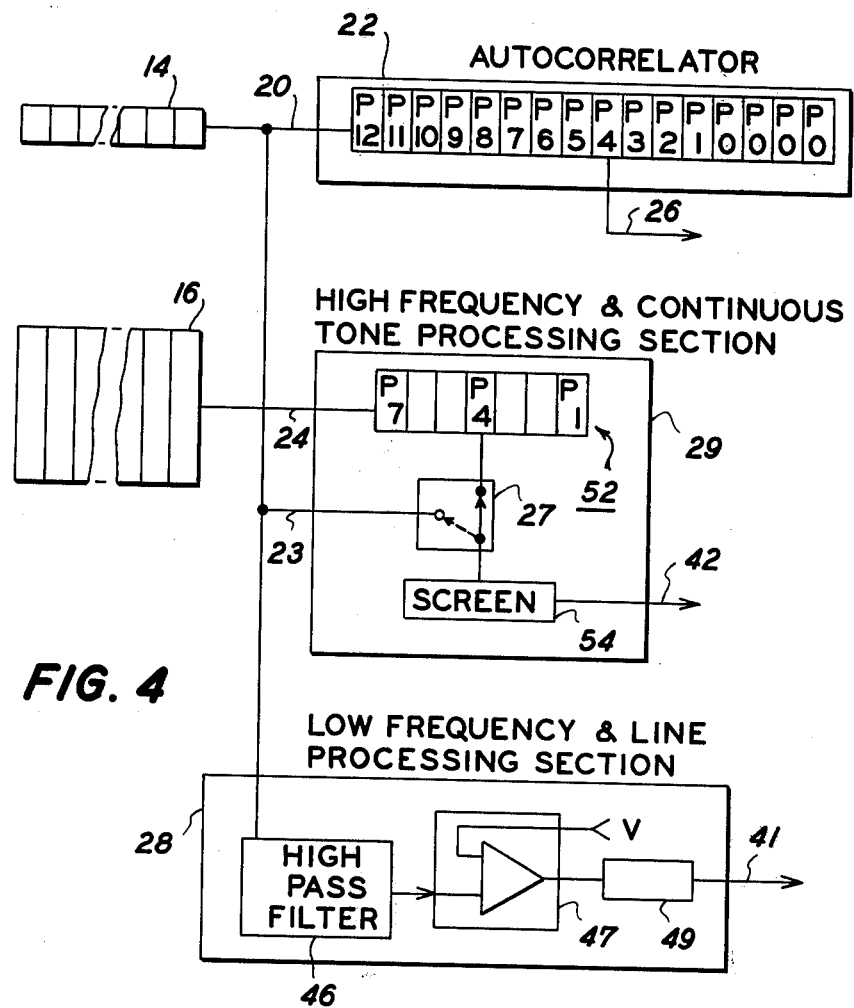
FIG. 4 is a block diagram showing details of the image processing architecture shown in FIG. 3.

Referring particularly to FIG. 4, low frequency halftone and line copy processing section 28 includes a suitable high frequency enhancement filter 46 selected to provide a detail enhancement of the low frequency halftone image data or line copy image data in a manner understood by those skilled in the art. One implementation consists of a transversal filter similar in implementation to that of the hereinafter described descreening filter 52 with a different weighting function.

Thresholder 47 comprises any suitable thresholding circuit such as a Texas Instruments 74S85 comparator, effective to threshold the pixel being examined (pixel $P_4$) with the output of circuit 47 going to binary line storage/delay buffer 49. For example, thresholder 47 may provide a single level threshold against which the pixel being examined (pixel $P_4$) is compared.

Where the image pixels are determined to comprise low frequency halftone or line copy image data, the data in storage/delay buffer 49 is output through line 41 and selector 25 to output 30. In other cases, the processed data is discarded.

High frequency halftone and continuous tone processing section 29 employs a one dimensional descreening filter 52. For example, where the scanning frequency is 500 scan lines/inch, filter 52 may comprise a simple low pass 1×7 matrix linear filter preferably tailored to provide some enhancement for sharpening edges at the points where signal levels change, to smooth out the high frequency image pixel output of low resolution array 15. Following descreening, the image pixels are fed via selector 27 to a relatively low frequency electronic screen 54 of the type preferably employing cyclic changes in threshold values whereat the pixels are rescreened at a lower frequency. Where, as above, the original sampling frequency is 500 scan lines/inch, one suitable screen comprises a 70 cells/inch 45° screen with conventional S-shaped Tone Reproduction Control (TRC). Continuous tone image signals output by high resolution array 14 are input directly to screen 54 through selector 27.

Preferably, as will be understood by those skilled in the art, the size of the filter chosen scales with the sampling frequency.

Where the image data is determined by autocorrelator 22 to be high frequency halftone data, screen 54 is coupled through selector 25 to output 30. In other cases, the data is discarded.

Figure 9:
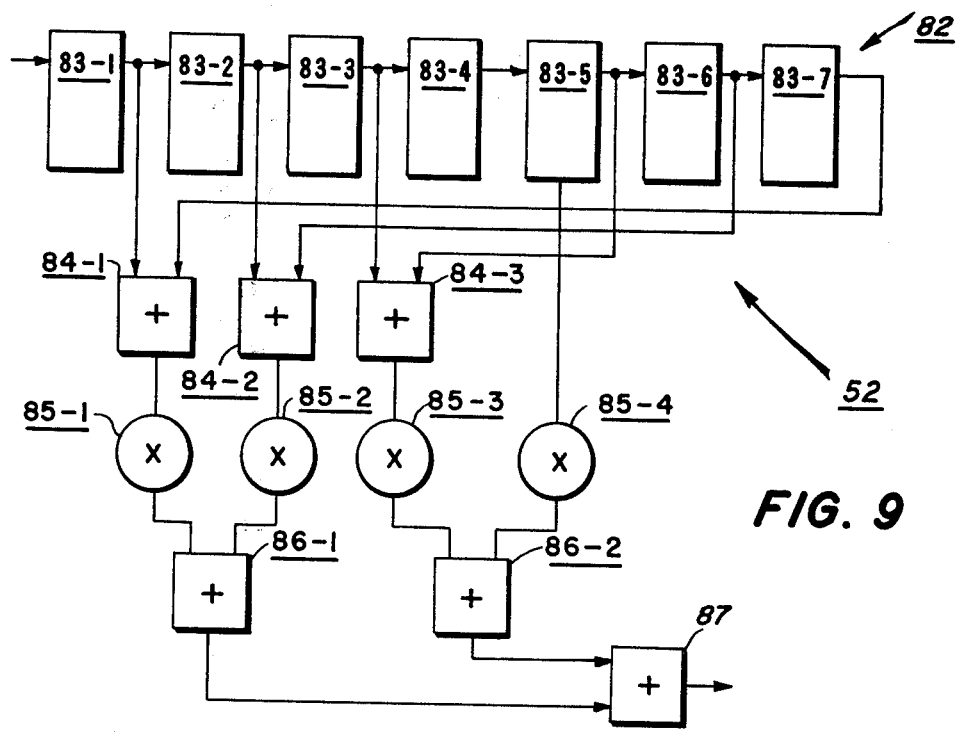
FIG. 9 is a schematic view of the descreening filter shown in FIG. 4.

Referring particularly to FIG. 9, details of descreening filter 52 of high frequency processing section 29 are thereshown. Filter 52 which screens in one dimension, i.e. the X direction has input shift register 82 composed of successive flip flops 83-1 through 83-7. The pixel input to register 82 is shifted sequentially through the flip flops 83-1, 83-2, ... 83-7 that comprise shift register 82.

Flip flops 83-1 and 83-7 have outputs coupled to adder 84-1, flip flops 83-2 and 83-6 to adder 84-2, and flips flops 83-3 and 83-5 to adder 84-3. Adders 84-1, 84-2 and 84-3, together with flip flop 83-4 are coupled to multipliers 85-1 through 85-4, multipliers 85-1 through 85-4 serving to multiply pixels input thereto by a coefficient multiplier related to the number of elements that comprise the filter matrix. In the example shown, filter 52 has a 1×7 matrix for a total area of 7 pixels. As a result, multipliers 85-1, 85-2, and 85-3 are programmed to multiply by a factor of $\frac{1}{8}$ while multiplier 85-4 is programmed to multiply by a factor of $\frac{1}{4}$. Multipliers 85-1 and 85-2, and 85-3 and 85-4 are coupled to adders 86-1 and 86-2 which sum the inputs thereto. Adders 86-1 and 86-2 are coupled to adder 87 which sums the inputs thereto to provide the output from filter 52.

It will be understood by those skilled in the art that a digital transversal filter transfer function can be optimized to perform various weighted averages of the two dimensional context.

In the foregoing circuit, the flip flops used therein may comprise Texas Instruments Model 745174 chips, the adders Texas Instruments Model 74S183 binary adders and the multipliers TRW Model MPY8A binary multipliers.

In operation, filter 52 effectively sums the pixel image values of each 1×7 pixel matrix including the pixel (i.e. pixel $P_4$) being processed, and divides (through fractional multiplication) the total by the number of pixels that comprise the screen matrix, in this instance, 7. The result is the weighted average pixel value of the neighborhood of the pixel being examined (i.e. pixel $P_4$) which represents the decreened value thereof.

Determination of the presence of continuous tone images is made by the operator or user through a visual examination of original 12. Where continuous tone images are found, selector 27 is moved to the continuous tone position (the dotted line position shown in FIG. 3) to input image pixels generated by high resolution array 14 directly to screen 54 for screening. Selector 27 is controlled by a manually operated two-position controller 35 disposed at some conveniently accessible point.

To assure coupling of high frequency halftone and continuous tone section 29 to output 30, the output of controller 35, when in the continuous tone position, overrides autocorrelator 22 to set selector 25 so that section 29 is coupled to output 30.

Where the original 12 is not continuous tone, controller 35 is set in the solid line position shown in FIG. 3 of the drawings. This sets selector 27 to couple the output of descreen filter 52 to screen 54 (the solid line position shown in FIG. 3) so that high frequency image pixels generated by low resolution array 16 and descreened by filter 52 are input to screen 54 for rescreening. At the same time, control over selector 25 by controller 35 is relinquished.

In this circumstance, as original 12 is scanned by scanning array 10, autocorrelator 22 analyzes the image pixels generated by high resolution array 14 to determine the type of image being scanned, i.e. high frequency halftone or low frequency halftone and/or line. Where the image is determined by autocorrelator 22 to comprise high frequency halftone, a signal (i.e. "1") from autocorrelator sets selector 25 to couple the output of high frequency halftone and continuous tone processing section 29 to output 30. As a result, image pixels produced by low resolution array 16 and processed by section 29 are discharged to output 30.

Where the image being scanned is determined not to comprise high frequency halftone, the signal (i.e. "0") from autocorrelator 22 sets selector 25 in the solid line position shown in FIG. 3 to couple low frequency halftone and line processing section 28 to output 30. As a result, image pixels generated by high resolution array 14 and processed by section 28 are discharged to output 30.

While manual determination of the presence of continuous tone images by the operator or user through the use of selector 27 is disclosed herein, automatic determination of the image type may be envisioned. One suitable system for automatically identifying image type and processing image signals or pixels in accordance therewith is disclosed in the aforecited U.S. Pat. No. 4,194,221, incorporated by reference herein.

Referring now to FIGS. 1, 2 and 3, and presuming scanning of the original 12 to be in the direction shown by the arrow 36, it may be seen that high resolution array 14 scans or views the document ahead of low resolution array. Preferably, processing of the image pixels generated by arrays 14, 16 is carried out at a point when the image line scanned by high resolution array 14 is centered with respect to the image line scanned by low resolution array 16. For example, if low resolution array 16 is presumed to scan five lines (i.e. lines $L_1$, $L_2$, $L_3$, $L_4$, $L_5$, in FIG. 2) for every one line (L) of high resolution array 14, processing is desirably carried out when scan line $L_3$ of low resolution array 16 and scan line L of high resolution array 14 coincide.

To accomplish the above described relationship, line buffer 49 serves as a temporary store for image pixel lines output by high resolution array 14 pending scanning thereof by low resolution array 16. In the exemplary arrangement shown and presuming the space 19 between arrays 14, 16 to be the equivalent of one scan line, then line buffer 49 would comprise a 4-line buffer (i.e. line L, space 19, lines $L_1$, $L_2$). Since the image pixels are processed and hence are in binary form, the size of buffer 49 is relatively small as compared to a buffer for storing an equivalent number of lines of analog image pixels prior to processing.

Line buffer 49' in the output line 26 of autocorrelator 22 functions in a similar capacity to synchronize the operation of selector 25 by autocorrelator 22 with the scan line being examined.

Figure 10:
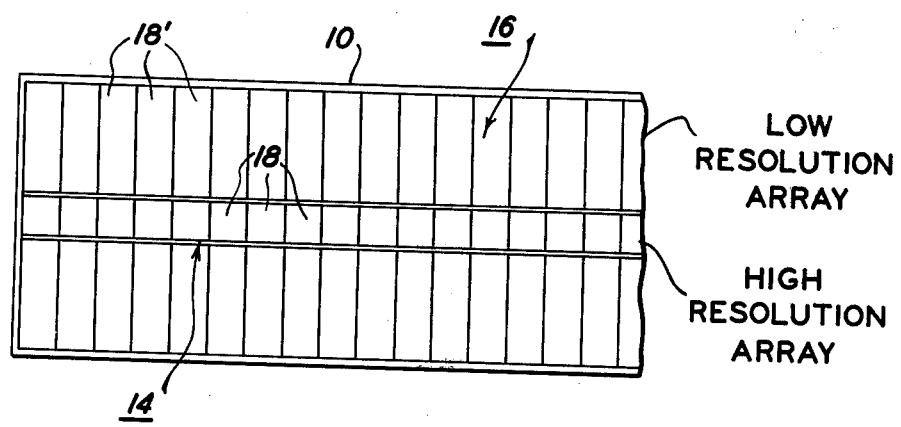
FIG. 10 is an enlarged view of an alternate multi-resolution array construction.

In the embodiment shown in FIG. 10 where like numerals refer to like parts, high and low resolution arrays 14, 16 are disposed on substrate 10 such that the longitudinal axis of array 14 is co-linear with the longitudinal axis of array 16. As a result, the cells 18 of array 14 are centered with respect to the cells 18' of array 16, cells 18' of array 16 occupying areas of substrate above and below cells 18 of array 14.

With high resolution array 14 centered with respect to low resolution array 16, the processing delay required where the arrays 14, 16 are offset from one another as in the previously described embodiment is unnecessary. Consequently, line delay buffers 49, 49' (FIG. 3) may be dispensed with in this embodiment.

Operation of the FIG. 10 embodiment is the same as that described in the previous embodiment except that delaying the output of line and low frequency halftone processing section 28 and autocorrelator 22 pending processing of image pixels by high frequency halftone and continuous tone processing section is no longer required.

Figure 11:
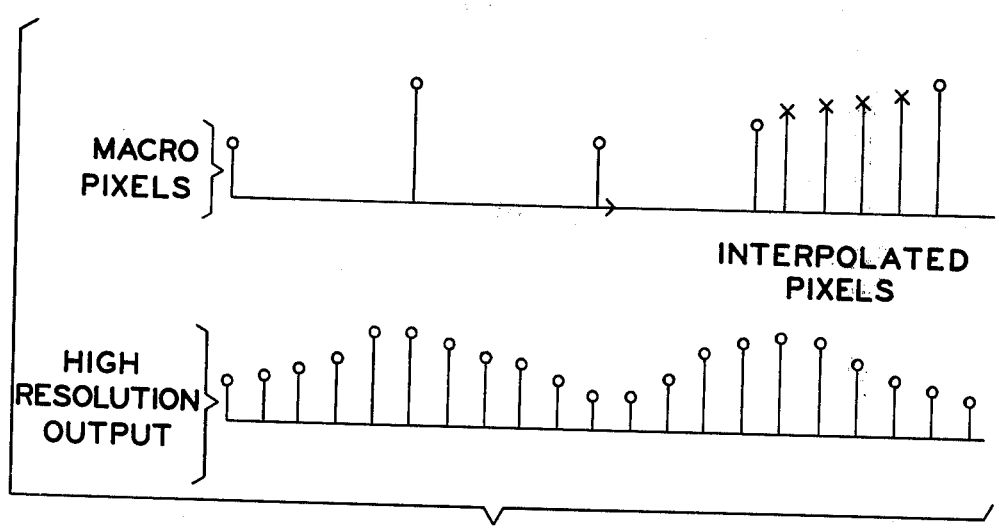
FIG. 11 is a graph comparing image signal output of the high resolution scanning array with the interpolated image signal output of the low resolution array.
Figure 12:
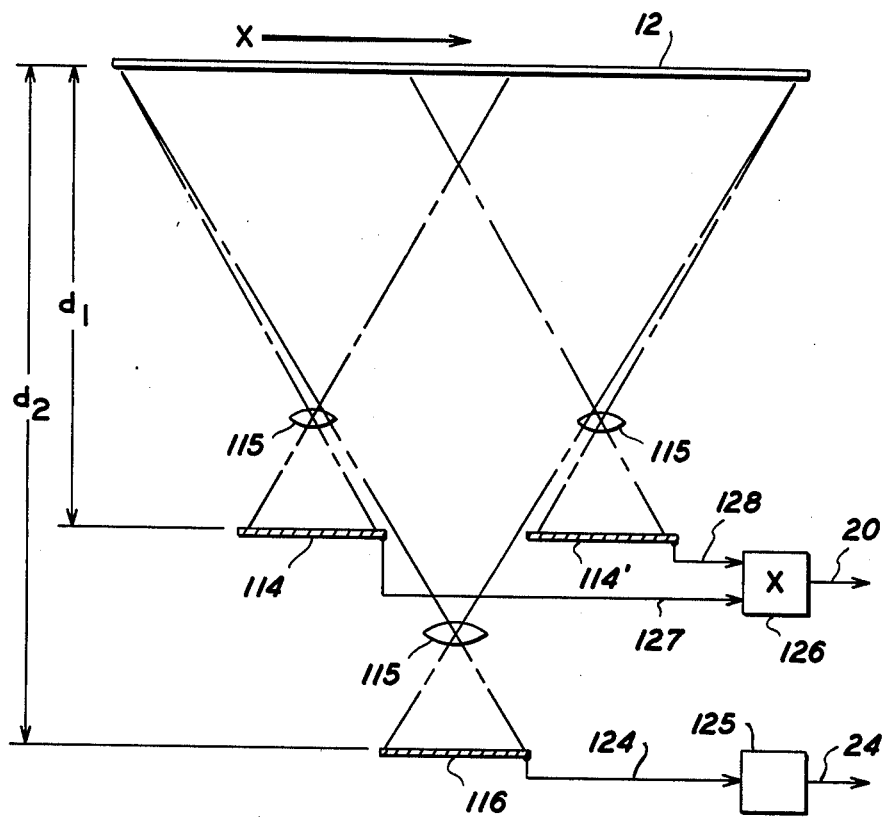
FIG. 12 is a top schematic view of an alternate architecture employing individual scanning arrays.
Figure 13:
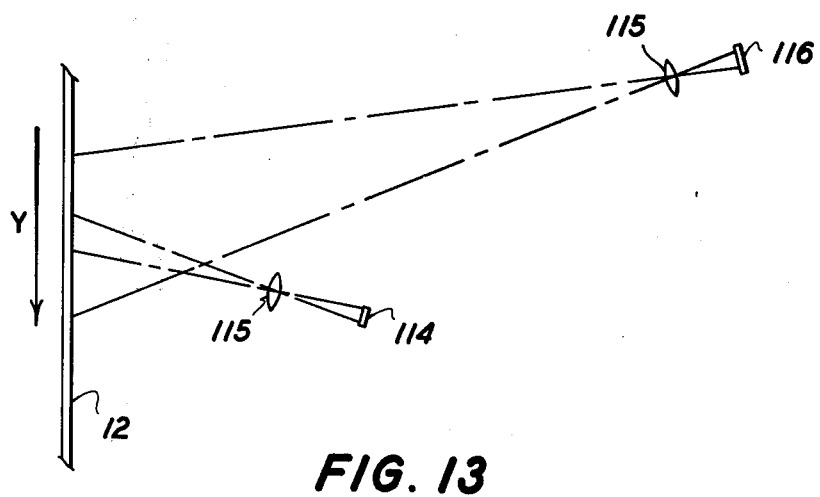
FIG. 13 is a side schematic view of the alternate architecture shown in FIG. 12.

Referring now to the embodiment shown in FIGS. 11, 12 and 13, where like numbers refer to like parts, individual arrays 114, 116 are provided to scan original 12. Preferably, arrays 114, 116 are the same size and type although arrays of different size and resolution may be contemplated.

To obtain high and low resolutions, high resolution array 114 is disposed relatively closer to original 12 than low resolution array 116. Suitable optical means, such as lenses 115 may be provided to focus arrays 114, 116 on original 12, as will be understood by those skilled in the art. The relative distances $d_1$, $d_2$, between arrays 114, 116 and the image plane are chosen to provide the desired resolution differential.

Since the size of the image area viewed by low resolution array 116 is larger in both the X and Y direction than the size of the image area viewed by high resolution array 114 with attendant decrease in image resolution of array 116 in both the X and Y directions, a suitable pixel interpolator 125 is provided in the output line 124 of array 116. Interpolater 125 serves to interpolate additional image pixels along the X-axis to equate the pixel resolution of low resolution array 116 to that of high resolution array 114. One suitable interpolator is disclosed in U.S. Pat. No. 4,193,092 issued on Mar. 11, 1980 to James C. Stoffel.

Inasmuch as the scan width of low resolution array 116 is greater than that of a single high resolution array 114, one or more additional high resolution arrays 114' are preferably provided to form a composite high resolution scanning system having a scan width equal to that of low resolution array 116. To assure an uninterrupted scan line, the viewing fields of successive high resolution arrays 114, 114' are preferably overlapped as described in U.S. Pat. No. 4,149,090 issued Apr. 10, 1979 to Martin A. Agulnek. A crossover control 126 is provided in the output lines 127, 128 of arrays 114, 114' to cross over from one high resolution array 114 to the next succeeding high resolution array 114' as image pixels are being read out from high resolution arrays 114, 114'.

Arrays 14, 16 may comprise any suitable scanning array for example, Charge Coupled Devices (CCD) manufactured by Fairchild Manufacturing Company, Model No. 121-1728. A suitable pixel clock (not shown) is provided for clocking image pixels and driving the various components in synchronism, as will be understood by those skilled in the art.

Figure 14:
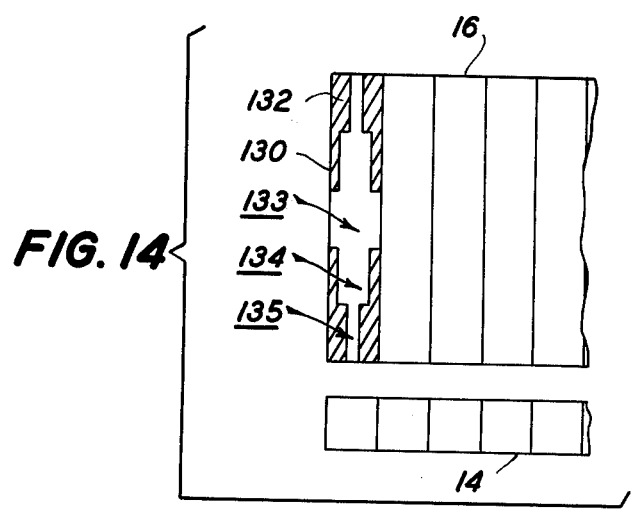
FIG. 14 is an enlarged view of an alternate multi-resolution scanning array with aperture mask to provide weighted pixel values.

Referring to FIG. 14, where like numbers refer to like parts, to provide predetermined weighted values to the image pixels produced by low resolution array 16 in the Y-direction, an apertured mask 130 is disposed over the array viewing elements or cells. In the exemplary arrangement shown, where it is presumed that low resolution array 16 scans an image area of five lines (i.e. lines L1, L2, L3, L4, L5), the viewing aperture 132 of mask 130 has a stepped configuration providing a full viewing aperture 133 for the line scanned concurrently with high resolution array 14 (i.e. line L3), a reduced viewing aperture 134 for the adjoining line pair (i.e. lines L2, L4), and a further reduced viewing aperture 135 for the next succeeding or last line pair (i.e. lines L1, L5). Mask 130 may be comprised of any suitable optically opaque material as for example, alumina.

While a stepped viewing aperture configuration is shown, other aperture configurations and sizes may be envisioned.

As will be understood by those skilled in the art, suitable reading circuitry may be provided to enable the image produced to be enlarged or reduced.

While the invention has been described with reference to the structure disclosed, it is not confined to the details set forth, but is intended to cover such modifications or changes as may come within the scope of the following claims:

We claim:

1. In an apparatus for processing image signals derived by raster scanning document originals, having reduced image signal buffer requirements, the combination of:
   first and second linear scanning arrays, the image resolution of said first array being greater than the image resolution of said second array to provide image signals of different image content without resort to buffer storage.

2. The apparatus according to claim 1 in which the image resolution of said first and second arrays is the same along the linear axis of said arrays.

3. The apparatus according to claim 1 in which the image resolution of said first array is greater than the image resolution of said second array along the axis perpendicular to the linear axis of said first and second arrays.

4. The apparatus according to claim 1 including means to establish predetermined relative weights to the image signals generated by said second array.

5. The apparatus according to claim 4 in which said last mentioned means comprises an apertured mask for effecting a predetermined reduction in the area viewed by said second array.

6. The apparatus according to claim 1 including:
   means for establishing scanning movement between said first and second arrays in a direction substantially perpendicular to the linear axis of said arrays, the resolution of said first and second arrays along said linear axis being the same, the resolution of said first array in the direction of scanning movement being greater than the resolution of said second array.

7. The apparatus according to claims 1 or 3 in which said first and second arrays are disposed on a common substrate whereby to form a unitary multiple array structure for scanning document originals.

8. The apparatus according to claim 1 in which the resolution of said first array is greater than the resolution of said second array along the linear axis of said arrays and along an axis perpendicular to said array linear axis.

9. The apparatus according to claim 8 including:
   interpolator means for generating additional image signals from image signals produced by said second array from scanning document originals whereby to equate the resolution of said second array to the resolution of said first array along the linear axis of said arrays.

10. The apparatus according to claim 9 in which the viewing fields of said first and second arrays overlap.

11. The apparatus according to claim 1 in which the linear axis of said first array is co-linear with the linear axis of said second array.

12. In an apparatus for processing image signals derived by raster scanning original images, the combination of: p1 (a) a low resolution scanning array having plural scanning elements for viewing relatively large areas of said original images and producing image signals representative of the image areas viewed;
   (b) first image signal processing means for processing image signals produced by said low resolution array to provide binary level image signals; p1 (c) a high resolution scanning array having plural scanning elements for viewing relatively small areas of said original images and producing image signals representative of the image areas viewed;
   (d) second image signal processing means for processing image signals produced by said high resolution array to provide binary level image signals; and
   (e) control means for selecting the output of one of said first and second image signal processing means.

13. The apparatus according to claim 12 in which said first image signal processing means includes:
   filter means for descreening image signals produced by said low resolution array; and
   rescreen means for rescreening said descreened image signals to provide said binary level image signals.

14. The apparatus according to claim 12 in which said second image signal processing means includes:
   filter means for filtering image signals produced by said high resolution array to enhance said image signals; and
   thresholding means for thresholding said enhanced image signals to provide said binary level image signals.

15. The apparatus according to claim 14 in which said thresholding means comprises an adaptive threshold circuit.

16. The apparatus according to claim 12 in which said first image signal processing means comprises screen means for screening image signals produced by both said low resolution array and said high resolution array.

17. The apparatus according to claim 12 in which said control means includes image analyzing means for selecting said first image signal processing means when said image is composed of substantially high frequency halftone image areas and for selecting said second image signal processing means when said image is composed of substantially line and/or low frequency halftone image areas.

18. The apparatus according to claim 17 including means to input image signals produced by said high resolution array to said image analyzing means.

19. The apparatus according to claim 12 in which the viewing fields of said low and high resolution arrays are in contiguous overlapping relation with one another.

20. In a multi-resolution image scanning apparatus the combination of:
   first array means for scanning a first image area with each scan; and
   second array means for scanning a second image area with each scan, said second image area being larger than said first image area whereby to provide plural image signals respresentative of different scanning resolutions.

21. The apparatus according to claim 20 in which said second array means includes:
   a plurality of scanning elements, each of said scanning elements having an aperture for viewing said image, and
   masking means for masking off portions of said apertures whereby to provide weighted image signal outputs from said second array means.

22. In a multi-resolution image scanning apparatus, the combination of: p1 first and second image scanning arrays, the viewing area of said second array being greater than the viewing area of said first array whereby said first and second arrays view the image with different resolutions; and
   means for substantially centering the viewing areas of said first and second arrays with one another whereby said first and second arrays scan overlapping areas of said image.

23. The apparatus according to claim 22 in which said centering means includes buffer means for temporarily storing the image signals output by the one of said arrays to first scan said image pending scanning of said image by the other of said arrays.

24. The apparatus according to claim 22 in which said centering means comprises optical means for focusing said first and second arrays onto said image at a common axis.

25. The apparatus according to claim 22 in which said centering means includes a common substrate for supporting said first and second arrays such that the linear axis of said first array is coaxial with the linear axis of said second array.

26. In a multi-resolution image scanning apparatus, the combination of:
   a first linear array for scanning one line of said image;
   a second linear array for scanning plural lines of said image; and
   means for substantially centering the viewing area of said first array with the viewing area of said second array whereby said first and second arrays scan in overlapping fashion to produce image pixels of different resolution.

27. A method of processing image signals derived by raster scanning document originals, the steps comprising:
   (a) scanning said originals at low resolution and at high resolution simultaneously to produce streams of low resolution and high resolution image signals concurrently;
   (b) independently processing said streams of low and high resolution image signals to provide binary level image signals; and
   (c) selecting one of said streams of low and high resolution binary level image signals in accordance with the imaginal content of the original being scanned.

28. The method according to claim 27 including the steps of:
   descreening said low resolution image signals to provide unscreened image signals; and
   rescreening said unscreened image signals to provide said binary level image signals.

29. The method according to claim 27 including the steps of:
   filtering said high resolution image signals to enhance said image signals; and
   thresholding said enhanced image signals to provide said binary level image signals.

30. The method according to claim 27 including the step of:
   analyzing said high resolution image signals to determine the imaginal content of the original being scanned; and
   selecting one of said streams of low and high resolution binary level image signals in response to the imaginal content of the original being scanned as determined from said analyzing.

* * * * *

UNITED STATES PATENT AND TRADEMARK OFFICE
CERTIFICATE OF CORRECTION

PATENT NO. : 4,288,821

DATED : September 8, 1981

INVENTOR(S) : Pierre A. Lavallee, James C. Stoffel

It is certified that error appears in the above–identified patent and that said Letters Patent are hereby corrected as shown below:

Column 10, line 26, delete "p1"

Column 10, line 32, delete "p1"

Column 11, line 28, delete "p1"

Signed and Sealed this

Tenth Day of November 1981

[SEAL]

Attest:

Attesting Officer

GERALD J. MOSSINGHOFF

Commissioner of Patents and Trademarks